US010613700B2

(12) United States Patent
Nadig et al.

(10) Patent No.: US 10,613,700 B2
(45) Date of Patent: Apr. 7, 2020

(54) RENDERING USER-INTERFACE ELEMENTS BASED ON VARIATION METAMODELS (71) Applicant: INTUIT INC., Mountain View, CA (US)

(72) Inventors: Deepak Nadig, Mountain View, CA (US); Jayanth Saimani, Bangalore (IN); Rajat Khare, Bangalore (IN); Vishwanath Ranganath, Bangalore (IN)

(73) Assignee: INTUIT INC., Mountain View, CA (US)

( * ) Notice: Subject to any disclaimer, the term of this patent is extended or adjusted under 35 U.S.C. 154(b) by 558 days.

(21) Appl. No.: 15/399,217

(22) Filed: Jan. 5, 2017

(65) Prior Publication Data

US 2018/0121026 A1    May 3, 2018

(30) Foreign Application Priority Data

Oct. 31, 2016  (IN) .............................. 201631037287

(51) Int. Cl.
*G06F 3/0481* (2013.01)
*G06F 9/451* (2018.01)
*G06F 17/21* (2006.01)
*G06F 17/27* (2006.01)
(Continued)

(52) U.S. Cl.
CPC ............ *G06F 3/0481* (2013.01); *G06F 9/454* (2018.02); *G06F 17/211* (2013.01); *G06F 17/2705* (2013.01); *H04L 67/02* (2013.01); *H04L 67/42* (2013.01)

(58) Field of Classification Search
CPC ...... G06F 3/0481; G06F 9/454; G06F 17/211; G06F 17/2705
See application file for complete search history.

(56) References Cited

U.S. PATENT DOCUMENTS 6,396,515 B1 *  5/2002  Hetherington .......... G06F 9/454
                                                    715/762
7,325,194 B2 *  1/2008  Moore ................ G06F 17/2247
                                                    715/255
7,539,747 B2    5/2009  Lucovsky et al.
                        (Continued)

OTHER PUBLICATIONS

PCT/US2017/057374, International Search Report dated Jan. 16, 2018, 15 pages.

(Continued)

*Primary Examiner* — Dino Kujundzic
(74) *Attorney, Agent, or Firm* — Patterson + Sheridan, LLP (57) ABSTRACT Embodiments presented herein provide techniques for rendering user-interface elements for an entity type based on a variation metamodel received in response to an API request. When a user invokes a function to access or create an entity, a user interface sends the API request to an API service. The API request identifies the entity type and is associated with context information about the user. The variation metamodel is selected by the API service based on the context information. The user interface receives and parses a response from the API service. The meta model includes metadata describing at least one aspect of a corresponding property of the entity type. Using the metadata as a guide, the user interface renders elements for the properties of the variation schema in a graphical user interface (GUI).

20 Claims, 6 Drawing Sheets (51) Int. Cl.
    *H04L 29/08*           (2006.01)
    *H04L 29/06*           (2006.01)

(56) References Cited

U.S. PATENT DOCUMENTS

| | | | |
|---|---|---|---|
| 2002/0111933 A1* | 8/2002 | Noble | G06F 17/211 |
| 2003/0079051 A1 | 4/2003 | Moses et al. | |
| 2008/0120129 A1* | 5/2008 | Seubert | G06Q 10/06 |
| | | | 705/35 |
| 2008/0172598 A1* | 7/2008 | Jacobsen | G06F 17/243 |
| | | | 715/224 |
| 2008/0208785 A1* | 8/2008 | Trefler | H04L 67/34 |
| | | | 706/47 |
| 2011/0307490 A1 | 12/2011 | Chow | |
| 2014/0074806 A1* | 3/2014 | Koren | G06F 17/273 |
| | | | 707/694 |
| 2014/0164902 A1* | 6/2014 | Sager | G06F 17/211 |
| | | | 715/234 |
| 2016/0098261 A1 | 4/2016 | Habib et al. | |

OTHER PUBLICATIONS

PCT/US2017/057343, International Search Report dated Jan. 31, 2018, 14 pages.
PCT/US2017/057409, International Search Report dated Feb. 1, 2018, 14 pages.
Ralph Mietzner et al., "Combining Different Multi-tenancy Patterns in Service-Oriented Applications," Enterprise Distributed Object Computing Conference, 2009. EDOC '09, IEEE International, IEEE, Sep. 2009, 10 pages.

\* cited by examiner

FIGURE 2

```
{
    company {
        ledgerAccounts {
            edges {
                node {
                    LedgerAccountMetaModel {
                        allowedOperations
                    }
                }
            }
        }
    }
}
```

FIGURE 3

```
{
    "data": {
        "company": {
            "ledgerAccounts": {
                "edges": [
                    {
                        "node": {
                            "LedgerAccountMetaModel": {
                                "allowedOperations" : [
                                    "CREATE", "UPDATE", "READ"
                                ]
                            }
                        }
                    },
                    {
                        "node": {
                            "LedgerAccountMetaModel": {
                                "allowedOperations" : ["CREATE"]
                            }
                        }
                    }
                ]
            }
        }
    }
}
```

RENDERING USER-INTERFACE ELEMENTS BASED ON VARIATION METAMODELS

CROSS-REFERENCE TO RELATED APPLICATIONS

This application claims benefit of India Provisional Patent Application Serial No. 201631037287, entitled "Rendering User-Interface Elements Based on Variation Metamodels," filed Oct. 31, 2016, which is assigned to the assignee hereof and the contents of which are hereby incorporated by reference.

BACKGROUND

Field

Embodiments presented herein generally relate to supporting variability in an application programming interface (API), and more specifically to rendering user-interface elements based on a variable metamodel received in an API response.

Description of the Related Art

Application programming interfaces (APIs) generally expose various routines and methods to software developers for use in obtaining and modifying data using features of a software application. These APIs may be accessible programmatically (e.g., as function calls programmed in an application or function library) or via a web resource for web-based applications. Web-based applications can invoke functionality exposed by an API, for example, using a Representational State Transfer function call (a RESTful function call), queries encapsulated in an HTTP POST request, a Simple Object Access Protocol (SOAP) request, or other protocols that allow client software to invoke functions on a remote system.

In some cases, such as software systems that are used globally and are subject to different operational requirements for different geographical regions in which the software systems are used, the operational requirements for those regions may be hard-coded in application source code. The source code generally uses functionality exposed by the API to retrieve data from a data service and format the data according to rules in the application source code or format data according to the rules and submit the formatted data to the data service to be committed to a persistent data store. For example, in an invoice generation workflow, tax rates applicable to provided goods and services, tax authorities that impose taxes on goods and services, required information in an invoice, and so on may differ based on a jurisdiction in which the organization that generates the invoice is located. As the operational requirements change, parameters in application source code are generally changed to reflect the changed operational requirements (e.g., changes in tax rates, goods and/or services to which tax is applied, changes in tax authorities, and so on). Because changes in operational requirements generally entail changes to application source code, supporting variability in an application may require that developers debug the application source, recompile the application, and provide update packages to application users.

Additionally, to support new variations in a workflow (e.g., new jurisdictions for an invoice generation workflow), developers generally need to generate application source code to support a workflow according to the operational requirements for the new variation of the workflow. Generating new application source code is a time-intensive process and may entail duplicating large amounts of source code. As the number of supported variations of the workflow—and the corresponding code base to support the variations of the workflow—increases, the amount of code to maintain increases. These increases in the amount of code to maintain may increase the amount of work required to maintain and update an application.

SUMMARY

One embodiment of the present disclosure includes a method for rendering an element in a graphical user interface (GUI). The method generally includes sending an application programming interface (API) request to a server, wherein the API request identifies an entity type and is associated with context information; receiving a response to the API request including a variation metamodel associated with the context information; parsing the response to identify a property included in the variation schema and metadata associated with the property; and rendering the element for the property in the GUI based on the metadata.

Another embodiment provides a computer-readable storage medium having instructions, which, when executed on a processor, performs an operation for rendering an element in a graphical user interface (GUI). The operation generally includes sending an application programming interface (API) request to a server, wherein the API request identifies an entity type and is associated with context information; receiving a response to the API request including a variation metamodel associated with the context information; parsing the response to identify a property included in the variation schema and metadata associated with the property; and rendering the element for the property in the GUI based on the metadata.

Still another embodiment of the present disclosure includes a processor and a memory storing a program, which, when executed on the processor, performs an operation for rendering an element in a graphical user interface (GUI). The operation generally includes sending an application programming interface (API) request to a server, wherein the API request identifies an entity type and is associated with context information; receiving a response to the API request including a variation metamodel associated with the context information; parsing the response to identify a property included in the variation schema and metadata associated with the property; and rendering the element for the property in the GUI based on the metadata.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

DETAILED DESCRIPTION

Application programming interfaces (APIs) generally expose methods and procedures that software developers can use to build software applications using features provided by a software system. These features may include, for example, database interaction, data processing, and so on. APIs generally define a set of inputs an application needs to provide for processing and a set of outputs generated by invoking that API. For example, assume a graphical user interface (GUI) invokes an API function call to retrieve data for display to a user. In such a case, an API service can receive unformatted data (e.g., a set of text) and format the strings according to the source code associated with a particular variation of a workflow (e.g., an invoice generation workflow for a particular jurisdiction). When the GUI receives a response, the GUI displays the retrieved data based on a template that is hard-coded in the GUI. When GUI invokes an API function call to write data to a data repository, the API service can receive unformatted data from a user and verify the data against rules in the source code associated with a particular version of a workflow. If the application determines that the data complies with rules in the application source code for a particular version of a workflow, the application can invoke an API function to commit the data to the data repository. Otherwise, based on hard-coded rules in the application source code, the application can generate alerts to inform a user that the input data does not comply with the rules established for the version of the workflow.

Typically, enabling a GUI to process multiple variations of a workflow (e.g., displaying invoices according to taxation rules for different jurisdictions) involves maintaining an independent code base for each variation of the workflow. As discussed, maintaining independent code bases for each variation of the workflow increases the amount of code to be modified as applications change. Additionally, when the processing rules for a particular variation of a workflow change (e.g., in a taxation example changing the name and applied tax rate of a tax agency), GUI source code and application source code may need to be recompiled, which is a computationally expensive process.

Embodiments presented herein provide techniques for rendering user-interface elements based on a variation metamodel included in a response to an API query. The variation metamodel is a construct that allows rules for displaying the requested data to be included in the query response itself. This allows the GUI to handle variability without having a hard-coded template for each possible variation of the rules for presenting the type of data requested. In one embodiment, the variation metamodel defines content items of an entity type using metadata describing rules for processing the content items. The GUI determines how to display the entity type based on the variation metamodel. When a new version of the variation metamodel is made, there is no need to update the source code of the GUI. The separation of the variation schema from the source code allows a single code base to be used for the GUI regardless of the entity variation used in any given instance. As the operational parameters and requirements for a codebase change, the underlying source code of GUI need not change to reflect, for example, updated or new rules for rendering the user-interface elements.

The term "entity type" refers to a type of form or record the user wishes to generate or access. For example, if a user requests data from a recent transaction to create an invoice, the user is creating a new instance of the invoice entity type. Tax forms, ledgers, and check stubs are also examples of entity types. Different entity types often record different types of information. For example, a ledger records debits and credits, while a balance sheet records assets and liabilities.

In one illustrative example, a user is an accountant. The accountant wishes to create a W-2 form for an employee who works in New Mexico. The accountant invokes a function in a GUI for creating a W-2 form. The GUI sends an API request identifying the entity type (a W-2 form, in this example) and the employee. An API service receives the request. The API service loads context information about the user making the request (including access privileges) and about the employee (including the state where the employee works). The API service identifies a variable metamodel for W-2 forms that is associated with New Mexico in a schema data store. The API service also retrieves unformatted data that is associated with the employee in a data store and corresponds to properties specified in the variable metamodel, such as the employee's home address, social security number, wages, and taxes withheld. The API service sends the unformatted data and the variable metamodel to the GUI in a response. The GUI parses the variable metamodel, which specifies that the employer's state ID number is required property for this variation of the W-2 entity type. Furthermore, the variable metamodel indicates that an employer's state ID number includes exactly eleven digits and two hyphens (e.g., formatted as XX-XXXXXXX-XXX). The variable metamodel also rules that apply to the other properties (e.g., that the social security number is read-only and has exactly nine digits and two hyphens formatted as XXX-XX-XXXX). Based on the variable metamodel, the GUI renders text fields for the properties and to fills in the actual values of the properties associated with this employee (the values are included in the unformatted data received in the response). Properties marked as read-only in the variable metamodel are rendered with read-only fields, while editable properties are rendered using editable fields. If the variable metamodel specifies that editing is an allowed operation for at least one of the properties, the GUI renders a button allowing the user to save changes. If the user attempts to enter invalid input into an editable field (e.g., the employer's state ID number), the GUI displays an advisory message and prevents the user from saving changes until valid input is provided.

In a second example, suppose the user wishes to create a W-2 form for an employee who works in Florida. As in the first example, the user invokes the function in the GUI for creating a W-2 form. Again, the GUI sends an API request identifying the entity type (a W-2 form, in this example) and the employee. The API service receives the request and loads context information about the user and about the employee. In this case, the API service identifies a variable metamodel for W-2 forms that is associated with Florida in a schema data store. The API service retrieves unformatted data that is associated with the employee and corresponds to properties specified in the variable metamodel, such as the employee's home address, social security number, wages, and taxes withheld. The API service sends the unformatted data and the variable metamodel to the GUI in a response. The GUI parses the variable metamodel, which specifies rules for W-2 properties. However, since Florida does not have a state income tax, the rules specified in this variable metamodel are different from the rules specifies in the variable metamodel for New Mexico. Specifically, the employer's state ID number is a disabled property in the variable metamodel for Florida. The GUI therefore does not render an element for the employer's state ID number in this example. However, as the other properties do not vary between the two states, the variable metamodel for Florida specifies the same rules for the other properties as the variable metamodel for New Mexico. The GUI therefore renders the elements for the other properties as in the first example.

Figure 1:
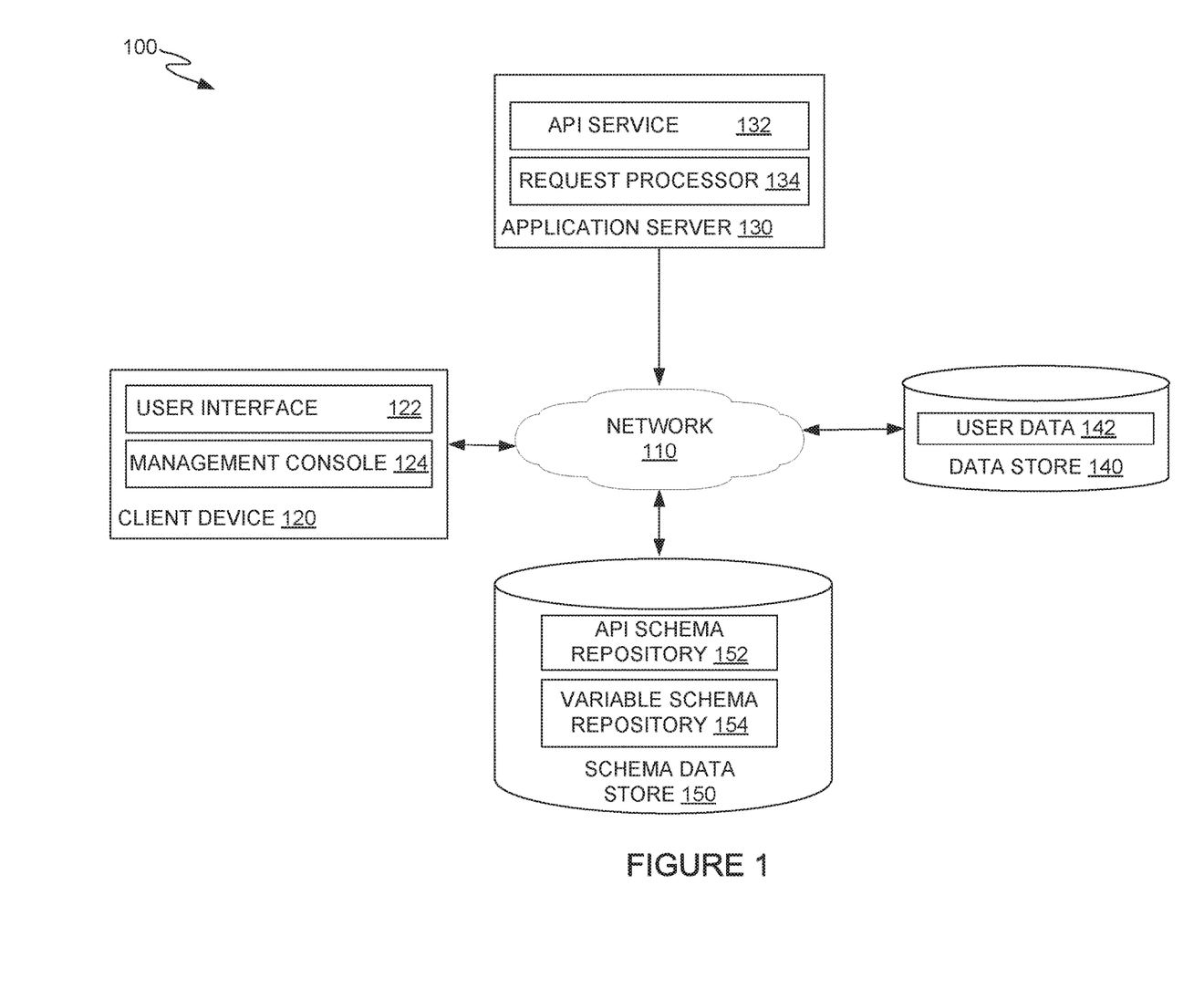
FIG. 1 illustrates an example computing environment for rendering user-interface elements based on a variable metamodel received in response to an API request, according to one embodiment.

FIG. 1 illustrates an example computing environment 100 for rendering user-interface elements based on a variable metamodel received in response to an API request, according to one embodiment. As discussed, the variable metamodels defined for an API are used to ensure that a GUI using a single code base can serve users with differing workflow variations. As illustrated, computing environment 100 includes a client device 120, an application server 130, a user data store 140, and a schema data store 150.

Client device 120 generally includes a user interface 122 and a management console 124. User interface 122 allows users to interact with data and services provided by a software system (e.g., via a graph-based API). User interface 122 generally displays graphical user interface (GUI) elements that allow a user to interact with an application hosted on application server 130. In an example, user interface 122 may allow a user to select data that the user wishes to view. Based on the selections received in user interface 122, client device 122 generates and transmits a query to application server 130. In some cases, the query may include information that application service 130 can use to determine context information associated with the query and retrieve a relevant variable metamodel to use in processing an API function call.

For example, the query may include context information about the user that is attempting to interact with application server. The context information may include, for example, information about a location of the user (e.g., to retrieve the proper data processing rules from schema data store 150 for a particular location or jurisdiction), an identity of the user (e.g., membership within defined security groups for which access to certain types of data is allowed or blocked), and so on.

In general, the term "context information" refers to any information associated with the query that an API service can use to narrow down which variable metamodel the application service 130 should provide to the user interface 122 for the data the user wishes to view. For example, suppose a user wants to create an invoice. The types of information that should be included on an invoice can vary depending on which jurisdictions govern the areas where the seller and the customer operate. Since jurisdictions are often defined using geographically boundaries, any information that helps identify where the seller and buyer are located (e.g., zip code, city, state, country, province, etc.) may be useful context information for the application service 130.

In response to a query, user interface 122 generally receives data from application server 130 and information about a variable metamodel to apply to the data displayed in user interface 122. The information about a variable metamodel to apply to the data displayed in user interface 122 can be used, for example, to determine types of user interface components to display to a user. If the variable metamodel identifies that data retrieved from application server 130 should not be visible to a user, user interface 122 can skip rendering a user interface element for those data items. Otherwise, user interface 122 can determine a type of form element to display to a user. If the variable metamodel indicates that a field is changeable, user interface 122 can display a text entry box to allow a user to modify the contents of the field. If the variable metamodel indicates that a field is selectable and that the field only accepts a single selection, user interface 122 can display a series of option buttons (or radio buttons) that allows a user to select a single operation from a list of options presented in user interface 122. If the variable metamodel indicates that a field supports selection of multiple operating parameters, user interface 122 can display the field as a series of checkboxes or other user interface element that allows for the selection of multiple options from a list.

Management console 124 allows a user to add variable metamodels to variable schema repository 154 and edit existing variable metamodels defined for an application executing in application server 130 based on changes outside of computing environment 100. For example, if a new tax authority is introduced in a jurisdiction, a user can edit the variable metamodel associated with an invoice generation workflow for that jurisdiction in management console and commit the updated variable metamodel to variable schema repository 154. Management console 124 may be, for example, a text editor that retrieves a variable metamodel from variable schema repository 154 in schema data store 150 and displays the text of the variable metamodel to a user for editing. In some cases, management console 124 may provide a graphical interface to allow a user to select new operational parameters associated with a variable metamodel (e.g., to enable the display of a previously hidden field in user interface 122).

Application server 130 generally includes an API service 132 and a request processor 134. API service 132 receives a query from a client device 120 and parses the request to identify one or more systems that should process different parts of the request. In some cases, the query from client device 120 may include a request for properties of the requested data. The properties of the requested data may be defined in a variable metamodel associated with the context of the query (e.g., user location, data access permissions associated with the user, and so on).

In some cases, the query received from client device 120 can include context information that API service 132 can use to obtain a variable metamodel for use in processing the query. The context information may be provided to API service 132, for example, in the header of an HTTP request (with the query provided to API service as a RESTful query or in an HTTP POST method) or otherwise based on information identifying the user that generated the query. In some cases, the context information can include a user identifier that API service 132 can use to determine context information for obtaining a variable metamodel to use in processing the request. For example, API service 132 can use a user identifier to query a data service for information about user location, group membership, or other data that API service can use to find a variable metamodel to use in processing the query.

After determining the context associated with a query, API service 132 provides the query and variable metamodel to request processor 134 for processing. Based on the query received from API service 132, request processor 134 can execute a query on user data 152 in data store 150 for the requested data. In some cases, request processor 134 may additionally include other logic for processing the requested data before transmitting the requested data and the variable metamodel to client device 120 for display in user interface 122.

Data store 140 generally is a repository storing data that request processor 134 can access to satisfy requests for data received at application server 130. As illustrated, data store 140 generally includes user data 142 in a sortable and searchable state. In response to a query received from request processor 134 at application server 130, data store 140 can return a set of data matching the parameters included in the request, and request processor 134 may perform additional processing on the returned data before providing the data to a client device 120 via API service 132.

Schema data store 150 generally is a repository for storing schema definition files for each node, or query, available in an API and variable metamodels describing processing rules for different workflows that can be executed on application server 130. As illustrated, schema data store 150 includes API schema repository 152 and variable schema repository 154.

Data stored in API schema repository 152 may define one or more functions provided by the API. As developers create API extensions through an API extender, files defining these API extensions may be committed to API schema repository 152. In some cases, schema data store 150 may also store a graph projection of the API, including extensions added to the API by various developers.

API schema repository 152 may additionally include data object models that define information available in the API that can be encapsulated in a data object and provided to client device 120 in response to a data request received from client device 120. For each data field enumerated in the data object, the API schema file includes metadata that indicates the properties of the data field. The properties can include, for example, at least the name of the data property and a data type (e.g., string, integer, single precision floating point number, double precision floating point number, and so on). Metamodels may be stored in API schema repository 152 as a series of markup files associated with a base data object.

Variable schema repository 154 generally includes schema files that define variations on a workflow that can be executed by application server 130. The schema files may include markup files or structured data files that define variations in workflow behavior relative to a base or default workflow, such as a YAML (Yet Another Markup Language) file, an XML (Extensible Markup Language) file, and so on. As discussed, the variable metamodel can define extensions to an entity type and operations that a user can perform with respect to data defined by the entity type in API schema repository 152. When a system administrator identifies variants of a workflow to add to the API, the system administrator can generate a schema file defining a variation of a workflow with references to the one or more data objects that the workflow will use. In some cases, a variable metamodel can define additional properties to apply to data fields enumerated in a data object used by the workflow variant. For example, the variable metamodel can include processing rules that define a valid (or invalid) string input for a data field defined in a data object. The processing rules may be structured, for example, as a set of regular expressions that define the format of a string stored in data store 140 and used by the API, minimum and maximum values for numerical data, and so on.

In some cases, the variable metamodels can define rules for processing data included in a data object. For example, in an invoice generation workflow, different variable metamodels can define rules for calculating taxes to apply to an invoice based on a jurisdiction of the user that generates the invoice. Variable metamodels associated with different jurisdictions can include processing rules for calculating the amount of tax payable to each tax authority in a given jurisdiction. A variable metamodel for a first jurisdiction with a national and local sales tax may define tax rates to be paid for goods provided by the seller, while a variable metamodel for a second jurisdiction with a national goods and services tax may define a single tax rate to be paid for goods or services provided by the seller.

In some cases, variable metamodels may exist for processing data based on a role of a user in an organization (e.g., roles determined by membership in an access group). In an invoice generation workflow, for example, some classes of users may need to be able to generate, edit, and view invoices (e.g., users who are a member of a billing/accounting group within an organization), while other classes of users may only need to be able to view invoices (e.g., external auditors who cannot generate invoices but may need to view invoices during the audit process). To allow for the use of a single UI code base to display data for different groups of users, variable metamodels may be defined for different users or groups of users. These variable metamodels can define the data that each type of user can access, whether a particular group of users has permission to write or edit certain types of data, and so on.

In some cases, variable metamodels may be used to extend data objects defined in the API. In some cases, the variable metamodels may be used to define custom data fields in a data object and the policies associated with the custom data fields. The custom data fields may be associated with a particular user or set of users, which allows groups of users to interact with user-specific extensions to the API that may not be usable by users or groups of users outside of a defined group.

The variable metamodels stored in variable schema repository 154 are generally associated with context information that identifies when API service 132 would select a particular variable metamodel for use in processing a query received from client device 120. A variable metamodel may be associated with, for example, a geographical location, a group of users, and so on. As discussed, when a user generates a query for processing at application server 130, API service 132 can identify a context associated with the query and obtain the matching variable metamodel for the query. By obtaining a matching variable metamodel for the context of the query, API service 132 can use a single interpreter to parse the variable metamodel and requested data into usable data that can be, for example, displayed in user interface 122 for a user to interact with (view, modify, delete, and so on).

Figure 2:
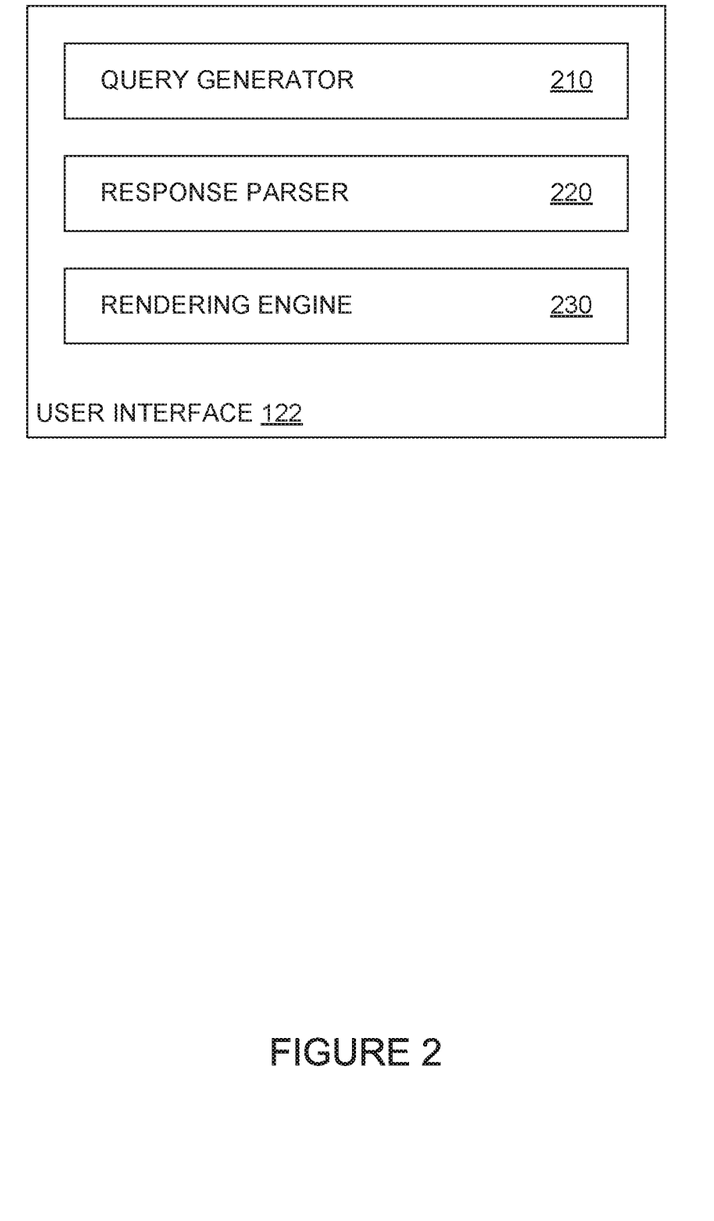
FIG. 2 illustrates a detailed view of a user interface, according to one embodiment.

FIG. 2 illustrates a detailed view of the user interface 122, according to one embodiment. As shown, the user interface (UI) 122 includes a query generator 210, a response parser 220, and a rendering engine 230.

In an example, the UI 122 allows a user to select data the user wishes to use to generate a form for a company's records. The type of form or record the user wishes to generate or access can be generally referred to as an entity type. For example, if a user requests data (e.g., user data 142) from a recent transaction to create an invoice, the user is creating a new instance of the invoice entity type. The UI 122 may provide the user with options to create many different types of entities, such as tax forms, ledgers, and other documents. Each entity type may include different types of information. For example, an invoice may include a seller name, a buyer name, an amount tendered, a sales tax amount, and related information. By contrast, a check stub may include an employee name, a gross income, deductions, and related information.

The types of information included may vary not only from one entity type to another, but also between different instances of the same entity type depending on the context in which each instance is generated. For example, a check stub for an employee in California may include a state income tax deduction, while a check stub for an employee in Texas would not include this information (since Texas currently does not have a state income tax). In this example, the state the employee works in is context information that can be used to identify whether to use a variable metamodel for check stubs in Texas or a variable metamodel for check stubs in California.

When a user requests data to generate a new entity instance or to edit an existing instance, the query generator 210 creates an API request identifying the entity type and requesting the data. The API request may be formatted as a RESTful request (e.g., in an HTTP address format) or in a JSON-like (JavaScript Object Notation) format. The UI sends the API request to the API service 132.

On the server side, the application server 130 receives the API request. The API service 132 also identifies context information associated with the request. Optionally, some of the context information may be explicitly included in the API request. Also, some or all of the context information (e.g., user authentication credentials) may already be available at the application server 130. The API service 132 determines which variable metamodel to use based on the context information. The API service may also determine which a data object model that partly defines the variable metamodel based on the context information. The variable metamodel includes metadata (e.g., a property type) for each property of the entity type.

The UI 122 receives the data to be displayed and the variable metamodel associated with the context in response to the API request. The response parser 220 identifies the metadata associated with each of the properties). The metadata for a property indicates one or more aspects of the property. For example, the metadata specifies a data type for the property. The type may be primitive (e.g., integer, character, Boolean, etc.) or an object type. In some cases, the data type of a property may be an entity type. (If this is the case, the response also specifies a variable metamodel for the entity type corresponding to the property.) Metadata also indicates whether a property is enabled for the entity type based on the context information and whether the property is editable or read-only. Metadata may also indicate a set of allowable values for the property. The allowable values can be explicitly included (e.g., in a list) or indicated using a regular expression or constraints on length or size. Metadata may also indicate a display format for the property (e.g., font, size, or color). The response may include a property specifying allowed operations that can be performed on an entity of the entity type. Thus, the metadata associated with a property can be considered a set of rules dictating whether the property is editable, which values the property can have, and how the property is to be displayed (if at all).

Once the response has been parsed, the rendering engine 230 renders graphical user interface (GUI) elements for each enabled property based on the metadata corresponding to that property. For example, the rendering engine 230 can render a respective button (or another interactive element) for triggering each allowable operation. If metadata indicates a property is textual and editable, the rendering engine 230 renders a corresponding editable text field. Conversely, if metadata indicates a property is read-only, the rendering engine 230 renders a non-editable text field. If metadata provides a list of allowed values for a property, the rendering engine 230 can render a drop-down list of the allowed values. If the variable schema indicates that a field is selectable and that the field only accepts a single selection, user interface 122 can display a series of option buttons (or radio buttons) that allows a user to select a single operation from a list of options presented in user interface 122.

The rendering engine 230 also fills in the data (e.g., the actual property values) that was received as part of the response. For example, if the user requested to view an existing ledger, the rendering engine 230 fills in the values of each line (or cell, depending on how the properties are defined) in the ledger.

If the metadata in the variable metamodel indicates that any properties listed in the variable schema are editable, the UI 122 allows the properties to be edited to the extent permitted by the metadata (e.g., subject to any validation rules that define allowable values for the editable properties). If a user attempts to enter or save a value that is not allowed for a property, the rendering engine 230 displays a message explaining the entered value is not allowed. In this manner, the UI 122 ensures the user does not break any validation rules set forth in the metadata.

Figure 3:
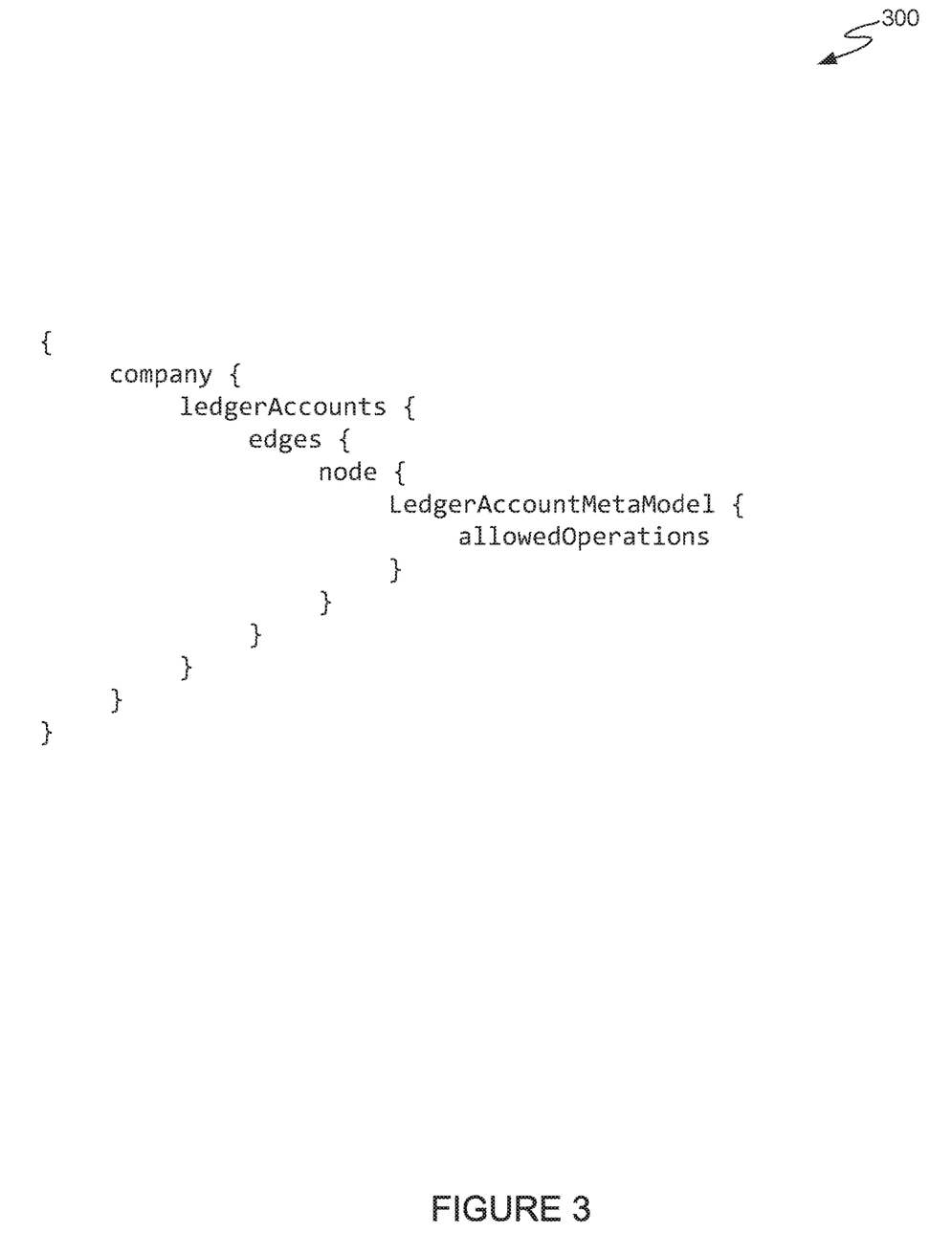
FIG. 3 illustrates an example API request, according to one embodiment.

FIG. 3 illustrates an example API request 300 for the data in a company's ledger accounts, according to one embodiment. In a GUI, a user requests to view the company's ledger accounts. A query generator generates API request 300. As shown, the API request 300 is formatted in a query language for APIs (e.g., GraphQL). The term "company" indicates the company for which the user is making the request. The term "ledgerAccounts" indicates the type of entity the user is requesting to view—in this case, the user wishes to view all ledgers belonging to the company. The term "node" is followed by braces that enclose details that are being requested for each company ledger (in this example, a node refers to a ledger). Specifically, the term "LedgerAccountMetaModel" indicates that a respective variable metamodel is requested for each company ledger. The term "allowedOperations" indicates that the variable metamodel for each ledger includes a property defining which operations are allowed on the ledger.

Figure 4:
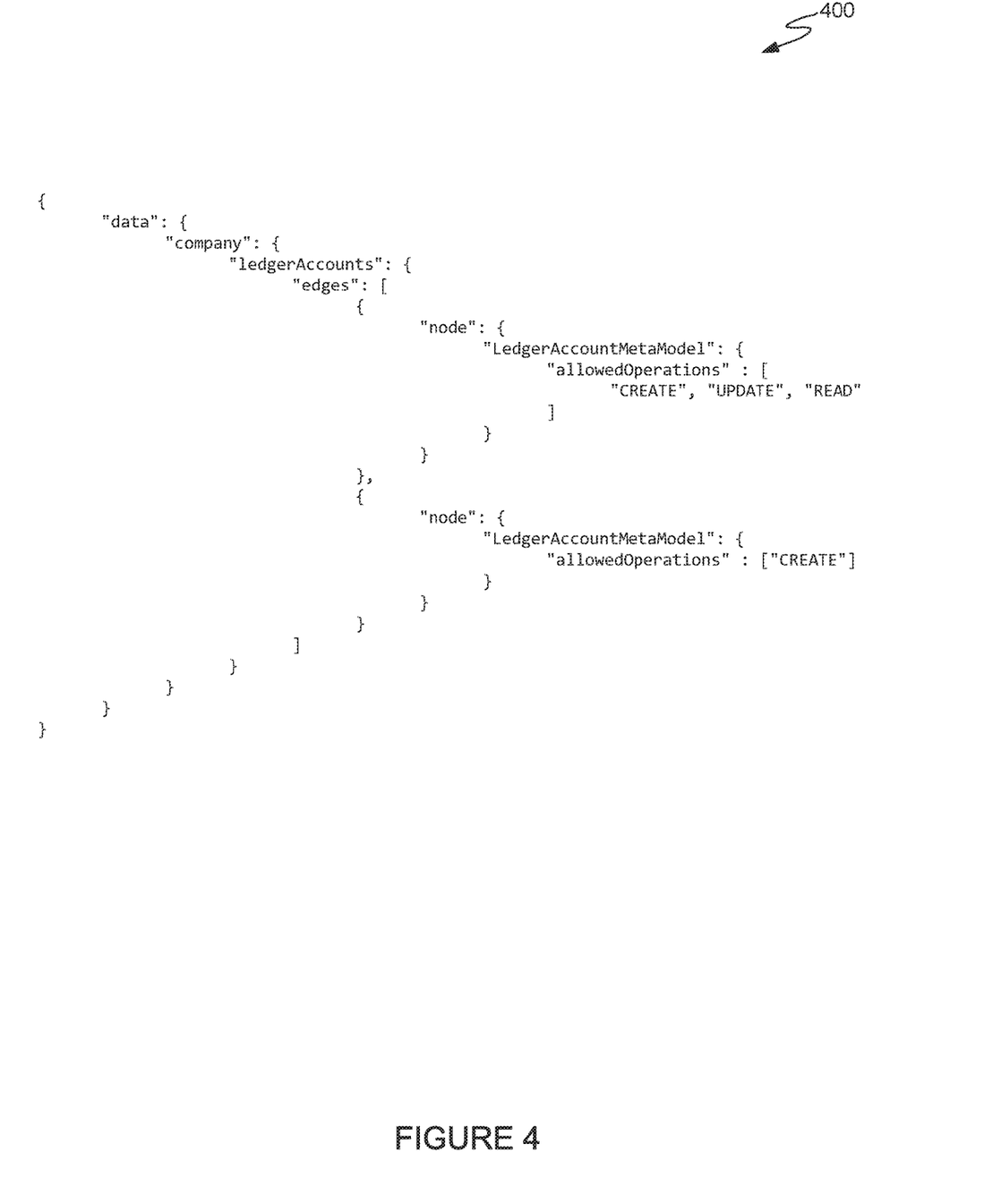
FIG. 4 illustrates an example response to an API request, according to one embodiment.

FIG. 4 illustrates an example response 400 to the API request 300, according to one embodiment. Again, the term "company" indicates the company for which the request 300 was made and the term "ledgerAccounts" indicates the type of entity the user requested to view. In the response 400, the term "node" appears twice because the company has two different ledgers. As shown, the response 400 includes a respective variable metamodel ("LedgerAccountMetaModel") for each of the two ledgers (nodes, in this example). Each variable metamodel, in turn, includes the allowedoperations property ("allowedOperations"). The first variable metamodel specifies that the operations "CREATE," "UPDATE," AND "READ" are allowed for the first node. The second variable metamodel specifies that the operation "CREATE" is allowed for the second node.

Assume, for example, that the user is a bookkeeper for the company. The company ABC keeps two ledgers as part of a double-entry bookkeeping system. The user has full access create, read, and edit, to the first ledger, but is only allowed to create entries in the second ledger because of auditing regulations. The user logs on to an application server and invokes a function to access the company ledgers. When the user invokes the function, the user provides a user identifier (ID). Based on the user identifier, the API service can gather additional context information from databases associated with the API service. The API service determined that the user should be allowed to create, update, or read entries in the first ledger, so the API service includes a variable metamodel marking all three operations as allowed for the first ledger. However, the API service also determines that the user should only be allowed to create entries in the second ledger. For this reason, the API service specifies a variable metamodel marking only the "CREATE" operation as allowed for the second ledger.

The GUI receives the response 400 from the API service. For the first ledger, the GUI displays three buttons: a create button, an update button, and a read button. The user can perform an operation in the first ledger by clicking on the respective button for the operation. However, the GUI only renders a create button for the second ledger because the variable metamodel for the second ledger does not specify any other allowed operations.

Figure 5:
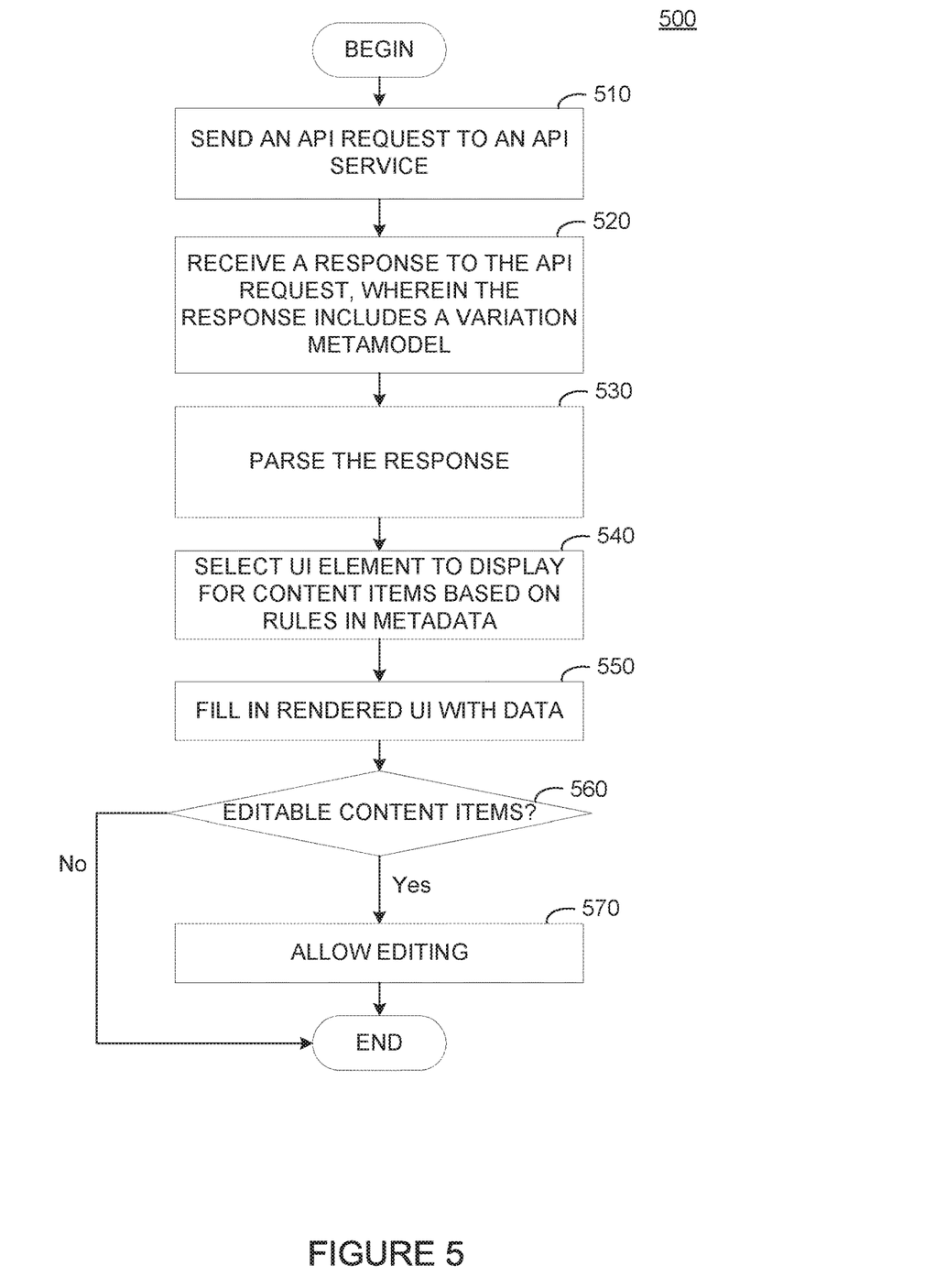
FIG. 5 illustrates a method for generating a context-appropriate graphical representation of an entity, according to one embodiment.

FIG. 5 illustrates a method for generating a context-appropriate graphical representation of an entity, according to one embodiment. At step 510, a GUI sends an API request to a server. The API request indicates an entity type for which a variable metamodel is requested. Examples of entity types include invoices, ledgers, tax forms, or other types of documents for which format and content may vary based on context. Step 510 may commence after a user invokes a function in the GUI to create or view an entity of the entity type. A query generator creates the API request in an appropriate format (e.g., a JSON-like format such as a GraphQL request) and the UI sends the API request to the server.

On the server side, the server receives the API request and associated context information. The context information may be included in the API request or may be received separately (e.g., beforehand when the user is authenticated to use the UI). The context information may identify the user submitting the request, the company for which the request is being submitted, a company client for whom the request is being submitted, and one or jurisdictions associated with the company or for the client. For example, suppose JD works for company ABC located in jurisdiction X and wants to generate an invoice for customer BA located in jurisdiction Y. The context information may include identifiers for JD, company ABC, jurisdiction X, customer BA, and jurisdiction Y.

At step 520, the UI receives a response to the API request. The API request includes a variable metamodel for the entity type that the server identified based on the context information. The variable metamodel specifies content items (e.g., properties) of the entity type. The variable metamodel includes metadata for the content items. The metadata for a content item can specify rules indicating how to process the content items in the GUI. For example, metadata can specify whether a content item is enabled (e.g., whether an element should be rendered for the content item given the context information), whether the content item is editable or read-only, a type (e.g., string, integer, real number, object, etc.), allowed values for the content item, constraints that define allowed values for the content item (e.g., length constraints or a regular expression a value must match to be allowed), or a display format for the content item (e.g., font, size, or color). The response may include serialized data, such as XML data or a JSON-formatted response (e.g., with JSON-like key-value pairs).

The response may include a content item specifying allowed operations that can be performed on an entity of the entity type. Like other aspects of the variable metamodel, the allowed operations may depend on the context information. For example, some users may be allowed to edit certain content item, while others may only be allowed to view property values. In another example, instances of the entity type may not be edited by anyone after being saved.

At step 530, the response is parsed at the UI (e.g., by a response parser) to identify the rules (e.g., validation rules) included the metadata of the variable metamodel for the content item of the entity type. The parsing also identifies the actual values for the properties (e.g., which are included in the response as unformatted data). At step 540, the UI renders elements for content items based on the rules found in the metadata. For example, if the metadata specifies that a certain operation (e.g., saving changes) is allowed, the UI renders a button for triggering the operation. In another example, if the metadata specifies that a textual content item can be edited, the UI renders an editable text field for the property. Conversely, if the metadata indicates an enabled content item is not editable, the UI renders a non-editable text field for the content item. In another example, if the metadata provides a list of allowed values for the content item, the UI can render a drop-down list of the allowed values or a list with checkboxes or radio buttons next to each allowed value.

At step 560, the UI determines whether any content items are editable. If so, the UI allows those content items to be edited subject to any validation rules specified in the metadata. For example, suppose a value for a selected content item has to match a regular expression included in the metadata. If a user inputs a value not matching the regular expression in a field rendered for the content item, the UI can display a message indicating the value is not allowed for the content item and prohibit the user from saving the entity instance until an allowable value is provided. In another example, suppose a value for a selected content item has to meet one or more length constraints (e.g., a maximum or a minimum character length) specified in the metadata. If a user inputs a value not meeting the one or more length constraints in a field rendered for the content item, the UI can display a message indicating the value is not allowed for the content item and prohibit the user from saving the entity instance until an allowable value is provided. In another example, suppose the metadata specifies that a selected content item is required. If a user clicks on a button to perform a save operation when no value has been entered in a field rendered for the content item, the UI displays a message indicating the content item is required and disallows the save operation until an allowable value is provided.

Figure 6:
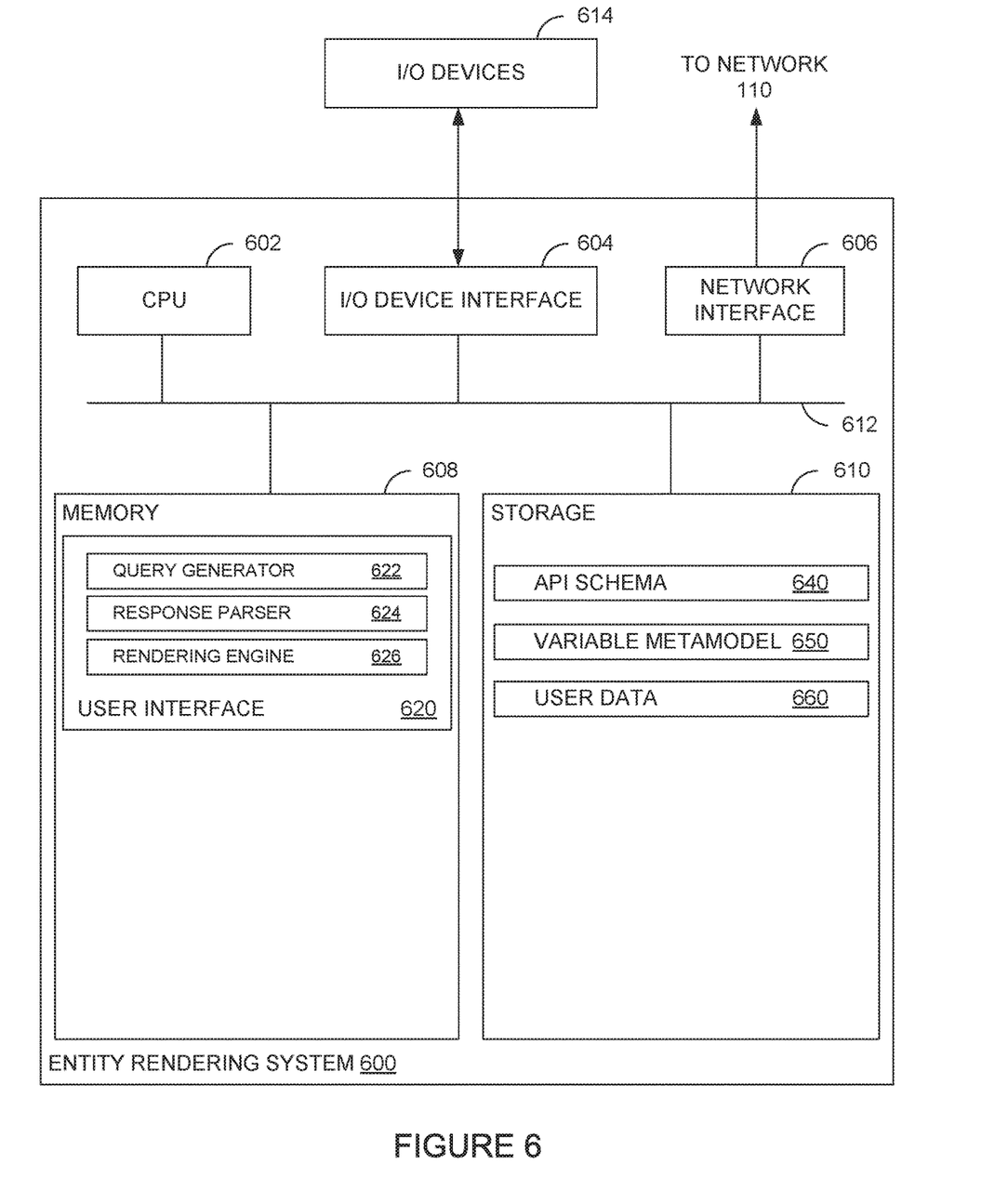
FIG. 6 illustrates an example entity rendering system for rendering user-interface elements based on a variable metamodel, according to an embodiment.

FIG. 6 illustrates an example entity rendering system 600 for rendering user-interface elements based on a variable metamodel, according to an embodiment. As shown, the entity rendering system 600 includes, without limitation, a central processing unit (CPU) 602, one or more I/O device interfaces 604 which may allow for the connection of various I/O devices 614 (e.g., keyboards, displays, mouse devices, pen input, etc.) to the entity rendering system 600, network interface 606, a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interfaces 604, network interface 606, memory 608, and storage 610. CPU 602 is included to be representative of a single CPU, multiple CPUs, a single CPU having multiple processing cores, and the like. Additionally, the memory 608 is included to be representative of a random access memory. Furthermore, the storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 includes a user interface 620, a query generator 622, a response parser 624, and a rendering engine 626. As shown, storage 610 includes an API schema 640, a variable metamodel 650, and user data 660. When a user invokes a function to access an entity type, the query generator 622 creates a query indicating the entity type and requesting a context-appropriate variable metamodel for the entity type. The user interface 620 sends the query to an API service via the network 110. The API service receives the query and identifies context information for the query. Some or all of the context information may be found in the query or in the user data 660. The API service uses API schema 640 to process the query and selects a variable metamodel 650 based on the context. The API service sends the variable metamodel 650 to the user interface 620 in response to the query.

The response parser 624 identifies metadata in the variable metamodel 650 for properties of the entity type. The rendering engine 626 renders elements in the user interface for the properties based on the metadata. The user interface 620 allows the user to edit field elements for properties that are marked as editable in the metadata (subject to any validation rules in the metadata).

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for rendering an element in a graphical user interface (GUI), the method comprising:
    sending an application programming interface (API) request to a server, wherein the API request identifies an entity type and is associated with context information;
    receiving a response to the API request including a variation metamodel associated with the context information, the variation metamodel including rules for displaying data included in the response to the API request for the entity type associated with the context information;
    parsing the response to identify a property included in the variation metamodel and metadata associated with the property; and
    rendering the element for the property in the GUI based on the metadata.

2. The method of claim 1, wherein the element is an interactive element for triggering an operation, and wherein the metadata specifies that the operation is allowed for the entity type.

3. The method of claim 1, wherein the element is a field, and wherein the method further comprises:
    receiving a value for the property through the field;
    determining the value does not satisfy a validation rule in the metadata associated with the property; and
    displaying a message in the GUI indicating the value is not allowed for the property.

4. The method of claim 1, wherein the element is a field, and wherein the method further comprises:
- receiving a value for the property in the response;
- identifying a format for the property based on the metadata; and
- displaying the value in the field in the format.

5. The method of claim 1, wherein the element is a list of allowed values for the property, and wherein the metadata specifies the allowed values.

6. The method of claim 1, further comprising:
- verifying that the property is marked as enabled in the metadata before rendering the element.

7. The method of claim 1, wherein the context information identifies a jurisdiction associated with the API request.

8. A system, comprising:
- a processor; and
- a memory storing one or more applications, which, when executed on the processors perform an operation for rendering an element in a graphical user interface (GUI), the operation comprising:
  - sending an application programming interface (API) request to a server, wherein the API request identifies an entity type and is associated with context information,
  - receiving a response to the API request including a variation metamodel associated with the context information,
  - parsing the response to identify a property included in the variation metamodel and metadata associated with the property, the variation metamodel including rules for displaying data included in the response to the API request for the entity type associated with the context information, and
  - rendering the element for the property in the GUI based on the metadata.

9. The system of claim 8, wherein the element is a button for triggering an operation, and wherein the metadata specifies that the operation is allowed for the entity type.

10. The system of claim 8, wherein the element is a field, and wherein the operation further comprises:
- receiving a value for the property through the field;
- determining the value does not satisfy a validation rule in the metadata associated with the property; and
- displaying a message in the GUI indicating the value is not allowed for the property.

11. The system of claim 8, wherein the element is a field, and wherein the operation further comprises:
- receiving a value for the property in the response;
- identifying a format for the property based on the metadata; and
- displaying the value in the field in the format.

12. The system of claim 8, wherein the element is a list of allowed values for the property, and wherein the metadata specifies the allowed values.

13. The system of claim 8, wherein the operation further comprises:
- verifying that the property is marked as enabled in the metadata before rendering the element.

14. The system of claim 8, wherein the context information identifies a jurisdiction or geographical region and is included in the API request.

15. A non-transitory computer-readable storage medium containing instructions that, when executed by one or more processors, perform an operation for rendering an element in a graphical user interface (GUI), the operation comprising:
- sending an application programming interface (API) request to a server, wherein the API request identifies an entity type and is associated with context information;
- receiving a response to the API request including a variation metamodel associated with the context information, the variation metamodel including rules for displaying data included in the response to the API request for the entity type associated with the context information;
- parsing the response to identify a property included in the variation metamodel and metadata associated with the property; and
- rendering the element for the property in the GUI based on the metadata.

16. The non-transitory computer-readable storage medium of claim 15, wherein the element is a button for triggering an operation, and wherein the metadata specifies that the operation is allowed for the entity type.

17. The non-transitory computer-readable storage medium of claim 15, wherein the element is a field, and wherein the operation further comprises:
- receiving a value for the property through the field;
- determining the value does not satisfy a validation rule in the metadata associated with the property; and
- displaying a message in the GUI indicating the value is not allowed for the property.

18. The non-transitory computer-readable storage medium of claim 15, wherein the element is a field, and wherein the operation further comprises:
- receiving a value for the property in the response;
- identifying a format for the property based on the metadata; and
- displaying the value in the field in the format.

19. The non-transitory computer-readable storage medium of claim 15, wherein the element is a list of allowed values for the property, and wherein the metadata specifies the allowed values.

20. The non-transitory computer-readable storage medium of claim 15, wherein the operation further comprises:
- verifying that the property is marked as enabled in the metadata before rendering the element.

* * * * *